(12) United States Patent
Turcanu et al.

(10) Patent No.: US 10,735,950 B2
(45) Date of Patent: Aug. 4, 2020

(54) TERMINAL SETTING CHANGE NOTIFICATION

(71) Applicant: Conversant Wireless Licensing S.a r.l., Luxembourg (LU)

(72) Inventors: Calin Turcanu, Helsinki (FI); Hans-Mathias Glatzer, Dortmund (DE)

(73) Assignee: Conversant Wireles Licensing S.a r.l., Luxembourg (LU)

( * ) Notice: Subject to any disclaimer, the term of this patent is extended or adjusted under 35 U.S.C. 154(b) by 0 days.

(21) Appl. No.: 16/126,417

(22) Filed: Sep. 10, 2018

(65) Prior Publication Data

US 2019/0104405 A1    Apr. 4, 2019

Related U.S. Application Data

(63) Continuation of application No. 15/276,273, filed on Sep. 26, 2016, now Pat. No. 10,104,539, which is a continuation of application No. 13/614,651, filed on Sep. 13, 2012, now abandoned, which is a continuation of application No. 10/855,614, filed on May 28, 2004, now Pat. No. 8,289,877.

(30) Foreign Application Priority Data

May 30, 2003    (GB) .................................. 0312489.8

(51) Int. Cl.
   *H04W 8/24*    (2009.01)
   *H04W 36/00*   (2009.01)
   *H04W 8/18*    (2009.01)

(52) U.S. Cl.
   CPC .......... *H04W 8/245* (2013.01); *H04W 8/183* (2013.01); *H04W 36/0005* (2013.01)

(58) Field of Classification Search
   None
   See application file for complete search history.

(56) References Cited

U.S. PATENT DOCUMENTS

| | | | | |
|---|---|---|---|---|
| 5,490,200 A | * | 2/1996 | Snyder | B60R 25/04 340/7.1 |
| 5,793,753 A | * | 8/1998 | Hershey | H04L 41/022 370/252 |
| 5,956,020 A | * | 9/1999 | D'Amico | G06F 3/0418 345/173 |
| 6,122,503 A | * | 9/2000 | Daly | H04W 48/16 455/419 |
| 6,243,023 B1 | * | 6/2001 | Katagiri | G01D 3/022 318/661 |
| 6,353,742 B1 | * | 3/2002 | Bach | H04W 24/08 370/332 |

(Continued)

FOREIGN PATENT DOCUMENTS

| | | |
|---|---|---|
| EP | 1251706 A2 | 10/2002 |
| WO | 2002/051188 A1 | 6/2002 |
| WO | 2002/089337 A2 | 11/2002 |

*Primary Examiner* — Hong S Cho
(74) *Attorney, Agent, or Firm* — Conversant Wireless Licensing

(57) ABSTRACT

There is disclosed a method, and a corresponding apparatus, for maintaining the settings of a user equipment, comprising: monitoring at least one stored setting in the terminal; responsive to a change in said at least one stored setting notifying a controller; and responsive to said notification selectively resetting said at least one stored setting.

5 Claims, 4 Drawing Sheets

(56) References Cited

U.S. PATENT DOCUMENTS

| | | | |
|---|---|---|---|
| 6,381,454 B1* | 4/2002 | Tiedemann, Jr. | H04W 8/265 455/419 |
| 6,408,175 B1* | 6/2002 | Park | H04L 63/0869 455/411 |
| 6,412,025 B1* | 6/2002 | Cheston | G06F 13/128 340/855.5 |
| 6,581,091 B1* | 6/2003 | Ruckmann | G06F 9/44505 709/203 |
| 6,904,026 B1* | 6/2005 | Tarnanen | H04W 8/183 370/329 |
| 6,917,964 B2* | 7/2005 | Kita | H04M 3/567 348/E7.079 |
| 6,952,577 B2* | 10/2005 | Michaelis | H04M 3/42153 455/414.1 |
| 6,958,983 B2* | 10/2005 | Musikka | H04L 45/00 370/329 |
| 7,075,568 B2 | 7/2006 | Aizawa | |
| 7,092,705 B2* | 8/2006 | Oldenburg | H04W 24/02 455/423 |
| 7,136,633 B2* | 11/2006 | Daly | H04W 48/16 455/418 |
| RE39,878 E* | 10/2007 | Leung | H04W 8/245 455/419 |
| 7,317,699 B2* | 1/2008 | Godfrey | H04L 29/06 370/328 |
| 7,561,540 B2* | 7/2009 | Dougherty | H01Q 1/06 370/310.2 |
| 7,809,365 B2* | 10/2010 | Oommen | H04W 8/245 455/414.1 |
| 8,289,877 B2 | 10/2012 | Turcanu et al. | |
| 2001/0024953 A1* | 9/2001 | Balogh | H04L 45/00 455/432.1 |
| 2002/0007238 A1* | 1/2002 | Moriguchi | H04L 29/06 701/36 |
| 2002/0126665 A1* | 9/2002 | Ueno | H04W 48/08 370/389 |
| 2003/0109272 A1* | 6/2003 | Mousseau | H04L 29/06 455/517 |
| 2003/0138149 A1* | 7/2003 | Iizuka | H04N 5/77 382/236 |
| 2003/0142066 A1* | 7/2003 | Hejza Litwiller | G06F 3/04847 345/156 |
| 2003/0229686 A1* | 12/2003 | Kortright | H04L 41/082 709/220 |
| 2004/0005892 A1* | 1/2004 | Mayer | H04W 8/08 455/432.1 |
| 2004/0203346 A1* | 10/2004 | Myhre | H04W 88/04 455/11.1 |
| 2005/0088980 A1* | 4/2005 | Olkkonen | H04W 48/16 370/255 |
| 2008/0040461 A1* | 2/2008 | Kumbalimutt | H04L 41/082 709/221 |
| 2009/0191857 A1* | 7/2009 | Horn | H04W 4/70 455/419 |
| 2013/0010626 A1 | 1/2013 | Turcanu et al. | |
| 2017/0111786 A1 | 4/2017 | Turcanu et al. | |

* cited by examiner

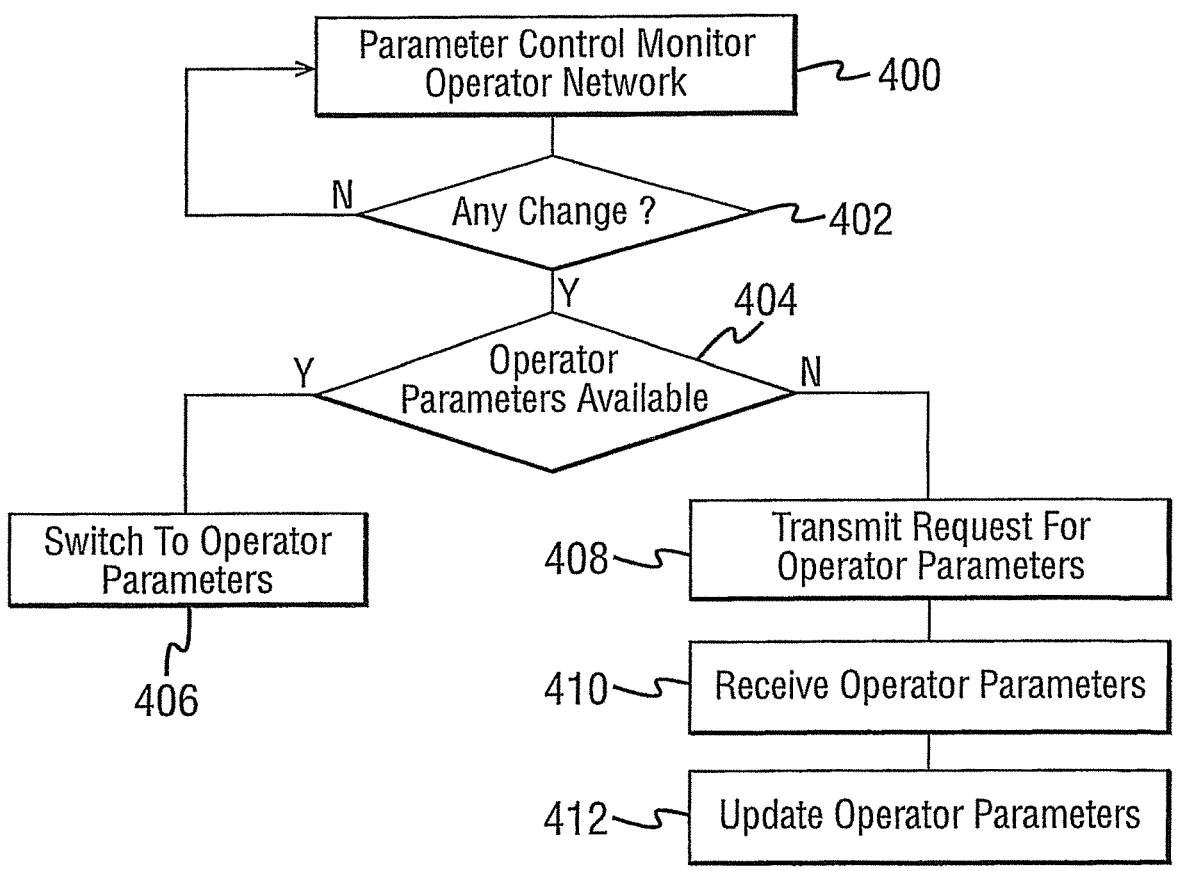

TERMINAL SETTING CHANGE NOTIFICATION

CROSS-REFERENCE TO RELATED APPLICATIONS

This application is a continuation of U.S. patent application Ser. No. 15/276,273 filed Sep. 26, 2016 which is a continuation of U.S. patent application Ser. No. 13/614,651, filed on Sep. 13, 2012 which is a continuation of U.S. patent application Ser. No. 10/855,614 filed May 28, 2004 now U.S. Pat. No. 8,289,877, which claims priority to GB Patent Application No. 0312489.8 filed May 30, 2003. The above-identified application is herein incorporated by reference in its entirety.

BACKGROUND OF THE INVENTION

Field of the Invention

The invention relates to the maintenance of network parameter settings in a device or terminal which accesses services provided by or through a network.

Description of the Related Art

In mobile communications systems, a terminal such as a mobile telephone handset is provided with parameter settings which configure the terminal for use in certain operations. For example, a terminal may include settings such as network specific information for different network services. The different network services may include, for example, GPRS access information, SMS (Short Messaging Service) access information, (Multimedia Messaging Service) MMS-settings, WAP settings, user profile information etc. Typically the terminal is configured with network specific information to enable use of such services. If this network specific information is changed, by the user or due to a terminal error, then the services associated with the information may become inaccessible.

If the terminal is rendered such that the service can no longer be accessed, a user may contact their services provider to obtain any necessary technical support. The technical support then may attempt to correct the problem over the phone by accessing and downloading the correct parameter settings to and from the terminal, or may instruct the user how to reconfigure the network settings of the terminal, or may require that the terminal be brought in for service.

This procedure for reconfiguring the network settings is disadvantageous. The cost to the operator is significant because of the need to provide trained and experienced staff to provide the technical support. The need to contact the service operator is inconvenient for a user of a device.

As stated hereinabove, the terminal is configured with network specific information to enable use of such services. In the event that a terminal is roaming, the terminal may become connected in a network to which the specific information for which the terminal is configured may not be useable. The fact that different network providers have different network specific information is one reason why handset manufacturers sell provider-specific variants of phones. As such the phone handset is pre-configured with the desired settings for the network. As a result, when the terminal is used for national or international roaming, certain services may become unavailable due to non-compatibility of a current operator with the phone settings. The user of the terminal may be unable to send MMS or reach their Mailbox or WAP service. The only way around this is to manually reconfigure the terminal settings. However this requires expertise on behalf of the user, and inconvenience.

SUMMARY OF THE INVENTION

The invention addresses one or more of the above-stated problems, and provides an improved technique for ensuring the correct settings of network parameters in a terminal.

Summary of the Invention

In a first embodiment there is provided a method of maintaining the settings of a user equipment, comprising: monitoring at least one stored setting in the terminal; responsive to a change in said at least one stored setting notifying a controller; and responsive to said notification selectively resetting said at least one stored setting.

The selective resetting may be in dependence on whether the change in said at least one stored setting is in error. The monitoring of the user equipment preferably takes place in the user equipment.

The notification to the controller preferably comprises a transmission to an operator domain for a service associated with the at least one setting. Thus if the setting is associated with an SMS setting, for example, the transmission is to an operator domain associated with such SMS service.

The notification to the controller may comprise a presence update. As such, the monitoring may be performed by a presence client within the user equipment. The presence update may simply provide an indication of a change in a certain setting, or may identify such change.

The notification selectively resetting the at least one stored setting may comprise transmitting the at least one stored setting to the user equipment. Such transmission may be made by any means of communication supported by the user equipment, such as over-the-air provisioning, SyncML, or smart messaging. In an embodiment utilising presence services, the transmission may originate from a presence server. In an alternative, the transmission may originate from a device management server.

The at least one stored setting may comprise one or more of a GPRS access point, an operator portal IP address, or SMS access information, or other variable terminal setting.

The method is preferably implemented in a mobile communication system, the user equipment being a mobile terminal which accesses services provided by or through a network, such as presence services.

Embodiments further provide user equipment having at least one setting associated with services, including: a storage means for storing said at least one setting; and a monitoring means for monitoring said at least one setting, and adapted, responsive to a change in said at least one setting, to transmit a notification of such change.

The services are preferably network services, preferably mobile network services. The settings are preferably variable settings. The settings are preferably user accessible variable settings.

The user equipment is preferably further adapted to receive a notification to set the at least one setting. Such notification preferably sets the at least one setting to its original setting before the detected change.

The monitoring means is preferably part of a presence client of the user equipment. The notification of the change is preferably a presence update.

Embodiments still further provide a communication system comprising a network for providing at least one service to at least one user equipment, the network being adapted to receive a notification from a user equipment of a change in a setting of such user equipment, and responsive thereto transmit a replacement setting to said user equipment.

The replacement setting preferably corresponds to the original setting in the user equipment.

The network preferably includes a presence server, said notification comprising a presence update. The presence server is preferably provided in an operator domain of the network.

The replacement setting may be transmitted by a device management server associated with said network.

The communication system is preferably a third generation mobile communication system, which system preferably supports presence services.

BRIEF DESCRIPTION OF THE DRAWINGS

For a better understanding of the present invention, reference will now be made by way of example to the accompanying drawings in which:

FIG. 4 illustrates the preferred method steps performed in the embodiment of FIG. 3.

DETAILED DESCRIPTION OF THE PREFERRED EMBODIMENTS

The present invention is described herein with reference to a particular example, and particularly with reference to a mobile telecommunications system. It will be appreciated by one skilled in the art that the invention is not limited in its applicability to the described embodiments.

In one embodiment of the present invention, the maintenance of network parameter settings in a terminal is provided for using a presence service architecture. Whilst the presence service architecture provides an especially advantageous basis for the implementation of the present invention, the invention is not limited to a presence services architecture environment.

The provision of presence services in mobile telecommunications systems is expected to be an important characteristic of third generation (3G) mobile communication systems. Presence services, and presence service architectures, are currently subject to standardisation procedures, and there is not yet a clearly accepted field of terminology. It should therefore be understood that for the purpose of the following description the functionality described is more important than the terminology used, and the invention should not be considered to be limited by any particular terminology used.

In general, presence is a dynamic (variable) profile of a user, visible to others and used to represent the user, share information, and control services. Presence information may contain, but is not limited to: person (i.e. user) and terminal availability; communication preferences; terminal capabilities; current activity; and location. Presence, therefore, relates to both user and terminal status.

The invention proposes, in an embodiment, the use of the terminal status aspect of presence services to maintain the terminal settings necessary for accessing network services.

Figure 1:
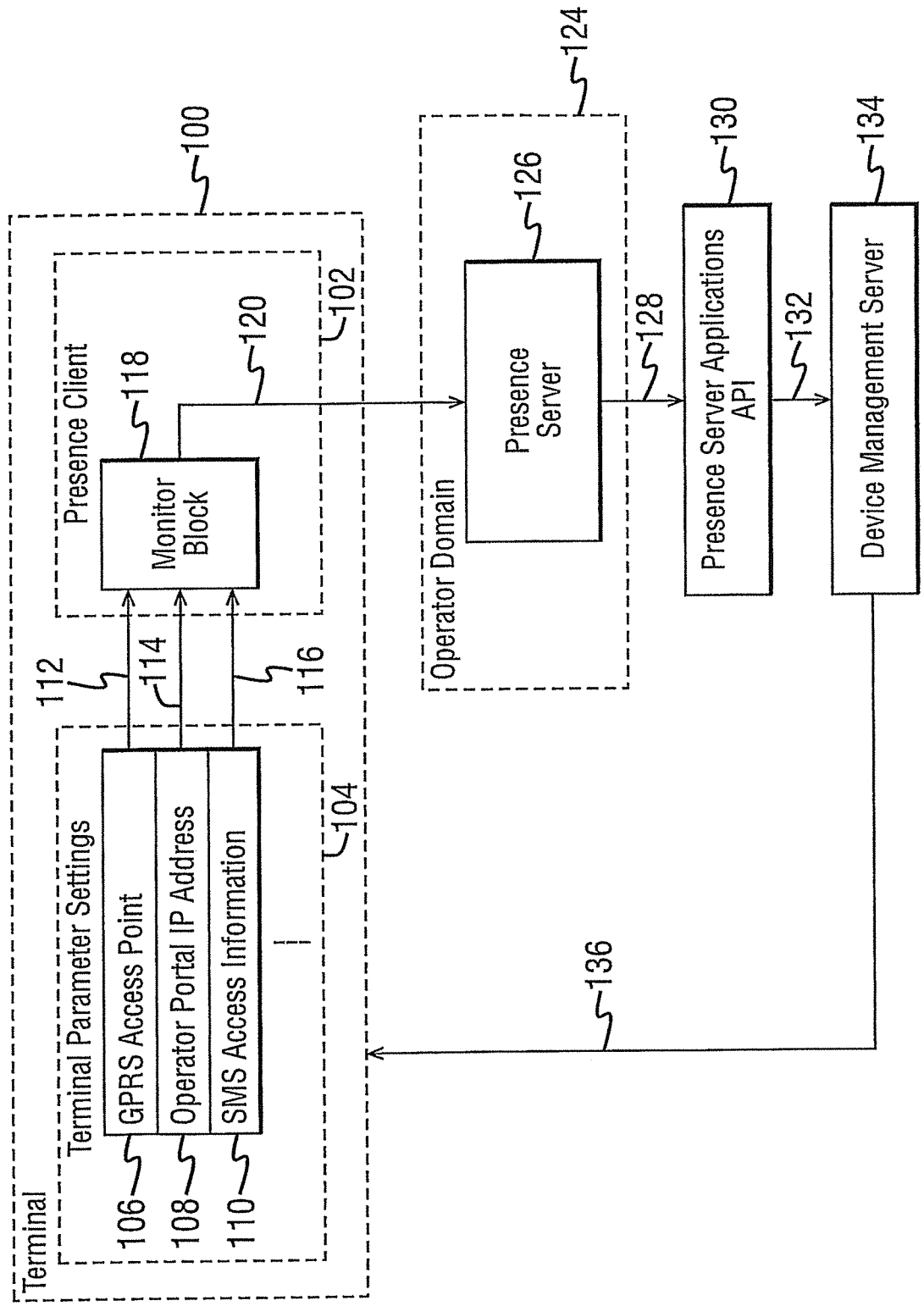
FIG. 1 illustrates an example implementation adapted in accordance with one embodiment.

Referring to FIG. 1, there is illustrated, generally: a terminal 100 including a memory 104 for storing terminal parameter settings, and a presence client 102; a presence server 126 in an operator domain 124; a presence server applications interface API 130; and a device management server 134.

As is known in the art, the terminal 100 stores different network specific settings as the terminal parameter settings in memory 104. These settings may include, for example, GPRS access point information in storage location 106, an operator portal IP (Internet protocol) address in storage location 108, and SMS (short messaging services) access information in storage location 110. Other or different network specific settings may be stored, e.g. MMS-settings, WAP settings, or user profile information. The network specific information is required to be correctly stored in order to access the associated network service. For example, the SMS access information may define the SMS messaging service centre number, without which the SMS service cannot be supported.

As currently occurs in the art, the user of a terminal may, by mistake, change one of the parameter settings, such as an IP address for a service, in the memory 104. Usage of that service may therefore be rendered impossible.

In accordance with the preferred embodiment of the present invention, the presence client 102 operating in the terminal 100 is adapted to monitor at least some of the parameter settings in the memory 104, or monitor at least some of the key terminal settings associated with various services. A terminal setting may be a parameter stored within the terminal that is given a certain value, and as such the terms 'parameter setting' and 'terminal setting' are interchangeable in the present description.

As such, the presence client 102 is provided with a monitor block 118, which receives on signal lines 112, 114, 116 key terminal settings from the memory locations 106, 108, 110. Thus the monitor block provides the means for monitoring the key terminal settings associated with the provision of certain network services. For example, the SMS access information in storage location 110 may include various further detail associated with the SMS service, but only the SMS call centre number may be provided on line 116.

Figure 2:
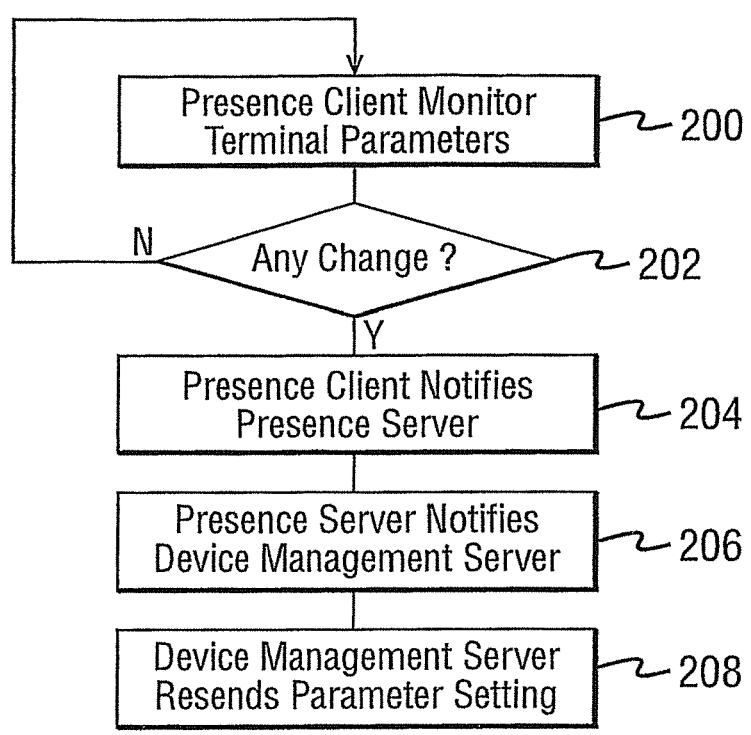
FIG. 2 illustrates the preferred method steps performed in the embodiment of FIG. 1.

With further reference to FIG. 2, the presence client 102 is adapted such that the monitor block monitors the parameter settings in a step 200, and identifies any changes in any such settings. Responsive to detection of a change in step 202, in a step 204 the presence client 102 is further adapted to notify the presence server associated therewith.

As illustrated in FIG. 1, the presence client 102 is adapted such that the monitor block 118 sends a presence update 120 to the presence server 126 in the operator domain 124. The presence update is sent using any mechanism that still has correct network settings. Thus if the presence update is to notify that the SMS setting parameters have been modified, such presence update may be sent to the presence server via a GPRS communication.

The communication of a presence update from the presence client to the presence server is well-known to one skilled in the art, and as such a detailed explanation of the presence update mechanism is not given herein.

The presence update therefore notifies the network operator that a terminal has an incorrect network parameter setting, and that the appropriate correct setting should be resent.

Various implementations may be provided. The communication from the user equipment may simply indicate that a particular setting has changed. It may indicate the value it has changed to. It may indicate that the setting has an error in it.

In some circumstances, the change in the setting may be intentionally made by the user. It may therefore be necessary to provide the setting value to the presence server in order to check the setting value.

Responsive to the presence update, the presence server 126 sends a request for the network parameter setting to be resent to the device management server 134 in a step 206. The presence server 126 is interconnected to the device management server 134 via the presence server applications interface API 130 which is a web service interface, as is known in the art. Thus the request from the presence server on line 128 goes to the presence server applications interface API 130, which in turn sends a request on line 132 to the device management server 134. The interconnection of the presence server to the device management server is well known to one skilled in the art, and is not described in any further detail hereinafter.

Finally, in a step 208 the device management server 134 resends the appropriate network parameter setting to the terminal, as represented by signal line 136 in FIG. 1. The parameter is thus automatically reset. The parameter is resent via, for example, over-the-air provisioning, SyncML, smart messaging etc. Various techniques for configuring such parameters in the terminal based on messages from the device management server are known in the art, and therefore are not described in detail herein.

In alternative arrangements, the presence server 126 may directly reply to the presence client with the correct settings for the parameters in the terminal.

Alternatively, the presence server may interface with another network element or element external to the network in order to return the correct settings to the terminal.

The invention thus advantageously provides an automated technique for maintaining the correct parameter settings in a terminal for accessing network services. Operator costs, such as operational cost, services maintenance, call service, helpdesk) are minimised by the automated mechanism.

The use of presence services clearly provides a particularly advantageous architecture for implementing the present invention, and as presence services are likely to be widely implemented, it is envisaged that an enhanced presence client will provide the most likely application scenario for the present invention.

However, in general the present invention relates to an automated technique for ensuring correct parameters are maintained in a terminal, and this may be provided by means other than by presence services.

It should be noted that in certain circumstances the change of a stored setting or parameter by a user may be intentional. In such case there may be no requirement to update the setting.

In the foregoing, an embodiment has been described in which it is desired to maintain the terminal parameter settings. This is on the assumption that the settings remain valid. It is mentioned above that the user may deliberately alter the settings. An example scenario where the user may deliberately alter the settings is to allow operation in a different operator domain which supports different terminal settings. In a further embodiment of the invention, described below, there is described an automated technique for updating the terminal settings in a handset or terminal as the handset roams into a different operator domain.

In one arrangement of this embodiment, the presence client 102 of the terminal 100 may be adapted to detect a change of operator domain, e.g. in dependence on a change in location. Alternatively the presence client may monitor the terminal's network connection in order to detect a change in operator domain.

Responsive to a change in operator domain, the monitor block 118 may be adapted to transmit a presence update to the presence server 126 in the operator domain. Responsive thereto, the presence server 126 may send a request to the device management server 134 to transmit the current terminal settings to the terminal, or reply directly thereto. In this way the presence client may ensure the terminal parameter settings of the terminal are updated whenever the operator domain changes.

This technique may be provided without the use of presence services. For example responsive to the detection of the terminal being connected in a new operator domain, the terminal may be adapted to transmit a request for a new set of terminal parameter settings to the network.

An example implementation in accordance with this embodiment is described with reference to FIGS. 3 and 4.

Figure 3:
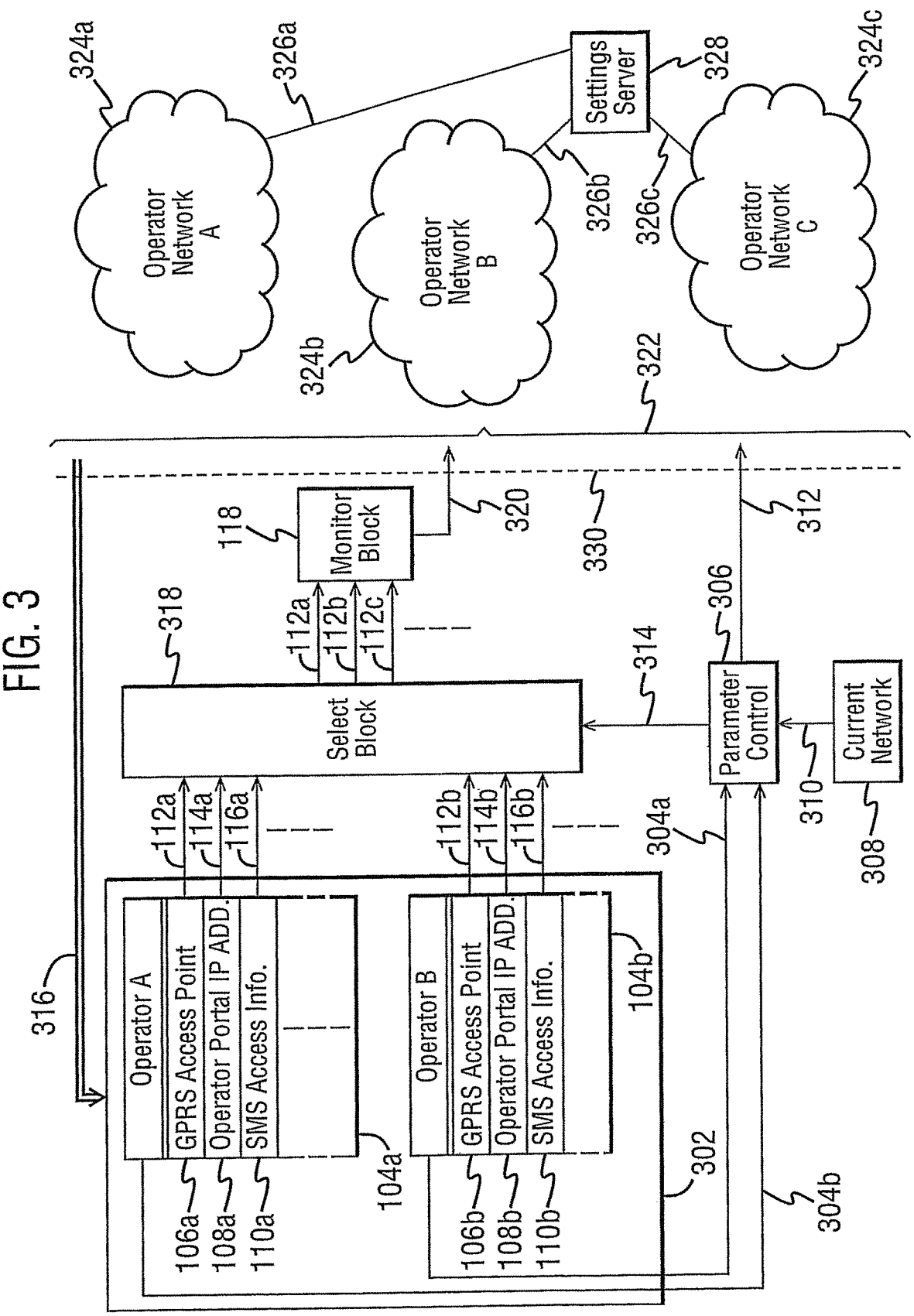
FIG. 3 illustrates an example implementation in accordance with another embodiment of the present invention.

Referring to FIG. 3, to the left-hand side of the dash line 330 there is illustrated the functional elements required in the terminal or handset for the purpose of implementing the example embodiment of the invention. To the right-hand side of the dash line 330 there is illustrated the network environment. The terminal or handset roams, and may connect into any local operator network in its environment. In FIG. 3, three operator networks are shown: operator network A 324*a*, operator network B 324*b* and operator network C 324*c*. The terminal or handset will be connected into one of these operator networks at any time.

In the example of FIG. 3, the terminal is provided with a memory which allows for a plurality of terminal parameter settings to be stored. The memory is generally designated by reference numeral 302, being a memory for storing a plurality of sets of parameter settings. In the example shown, the memory 302 includes a first set of parameter settings 104*a* and a second set of parameter settings 104*b*. As with FIG. 1, each of the set of parameter settings includes the different network specific settings required for the terminal connected to a particular operator network. The settings 104*a* are associated with an operator network being identified as "operator A", and the settings 104*b* are associated with an operator network being identified as "operator B". As in FIG. 1, each of the sets of terminal parameter settings include various values 106-110, appropriately designated as a or b. As also with FIG. 1, each of the sets of parameter settings are output on signal lines 112-116, with appropriate designations a or b. In the example embodiment of FIG. 3, the signals on lines 112-116 are input to a select block 318, and then one set of the signals is provided on an output signal line 112A-112C to the monitor block 118, which generates a signal on line 320 as in FIG. 1. Thus it can be seen that select block 318 merely operates, as described further hereinbelow, to present the appropriate set of terminal parameter settings to the monitor block 118. Only one set of terminal parameter settings is provided for use at any one time.

Although FIG. 3 illustrates that the memory 302 may be provided with two sets of terminal parameter settings, there may be provided further parameter settings. Alternatively, one set of parameter settings may be a fixed set of parameter settings associated with the terminal's home network, and the other set of parameter settings may be available for temporary storage of the current parameter settings of a visited network.

The terminal is further provided with a parameter control block 306, which receives on lines 304a and 304b the identities of the network operators associated with the respective sets of terminal parameter settings in the memory 302. The parameter control block 306 also receives on line 310 the identity of the current network from a current network block 308. The parameter control block 306 provides an output signal 314 to control the select block 318, and an output signal 312. As described hereinbelow, the output signal 312 is a request for parameter settings to the operator network. The terminal receives parameter settings from the operator network as designated by a communication input line 316 which forms an input to the memory 302.

Generally, reference numeral 322 represents the interface between the mobile terminal and the current operator network with which a connection is established, via a radio access network (not shown).

Each of the operator networks 324a-324c are connected, as discussed further hereinbelow, to a setting server 328 via a respective connection 326a-326c.

The operation of this embodiment of the invention is now described further with reference to the flowchart of FIG. 4.

In a step 400, the terminal monitors the current operator network identity. The current network identity is stored in the block 308 and provided on line 310 to the parameter control block 306. Thus the parameter control block 306, for the purposes of this example, monitors the current network identity.

If in step 402 the parameter control block 306 identifies a change in the network operator, then there is a requirement to update the terminal parameter settings for the new operator network.

In a step 404, the parameter control block 306 determines whether the operator parameters for the new operator network are already available in the terminal. In this respect the parameter control block 306 compares the network identity on line 310 to the operator network identities on lines 304a and 304b. If a match is determined, then the parameter control block 306 sets the control signal 314 to control the select block 318 to output the terminal parameter settings for the appropriate network operator. Thus in a step 406 there is made a switch to the appropriate operator parameters for the new operator network.

It should be noted that different operator networks may well share the same settings, such that one set of terminal parameter settings may be used for multiple operator networks. In such case the operator identity associated with terminal set 104a or 104b will include identities of all associated operator networks.

If the parameter control block 306 determines that the memory 302 does not store a set of terminal parameter settings for the current network setting, then in a step 408 the parameter control block 306 transmits a signal on line 312 in order to request the appropriate set of terminal parameter settings from the operator network. In practice, the signal on line 312 may be a control signal which is interpreted by other functional means within the terminal for transmission to the operator network.

In a preferred embodiment, there may be provided a single settings server 328 which stores the terminal parameter settings for all operator networks. As such the operator network within which the terminal is currently connected, may forward a request for terminal parameter settings to such settings server, and return a reply from the setting server to the terminal. Alternatively the operator network itself may provide the necessary terminal parameter settings.

In the present example, it is assumed the terminal has moved to a new operator network, being operator network C 324c. The radio access network associated with the operator network C receives the request for the new terminal parameter settings, and sends the request on line 326c to the setting server 328. The appropriate terminal parameter settings are retrieved and returned, to the operator network C, and forwarded through the radio access network to the terminal. The settings are received on line 316, and stored in the memory 302. Step 410 refers to the step of receiving the new operator parameters.

The operator parameters may be stored in an existing set of terminal parameter settings, i.e. they may overwrite a current set, or may be stored in an available vacant memory space.

In embodiments, the memory 302 may be provided with sufficient space for only one set of parameter settings, and only one set of parameter settings may be stored at a time. As such, the current set of terminal parameter settings are overwritten by any new set. This will require an update transaction, including an access to the operator network, whenever a mobile terminal enters into a new operator domain. In a preferred embodiment where the memory 302 allows for storage of multiple terminal parameter settings, a network access is not always required, as certain terminal parameter settings are always available in the terminal handset, such as the terminal parameter settings associated with the terminal's home network.

The request on line 312 for a new set of terminal parameter settings may be processed in any number of ways by the operator network. As discussed in the embodiment of FIG. 1, the parameter control block 306 may be associated with presence services, and a presence server in the operator domain may provide the terminal parameter settings. Alternatively a device management server in the operator network domain may provide the parameters. The provision of the parameters is an implementation issue.

In an embodiment, the request on line 312 to access and obtain a revised set of terminal parameter settings may be optional, and via the user interface of the terminal the user may be given the option as to whether the terminal settings should be updated. Such an optional feature may be particularly useful when the memory 302 is able only to store one set of terminal parameter settings. As this will require the overwriting of the default terminal settings for the home network, the user may not always wish to replace the settings. Furthermore as the updating of the settings requires a network access, there may be call charges or data downloading charges associated with the update. If the user will be charged for accessing and retrieving the updated terminal parameter settings, then the option for the user to choose not to update such settings must be provided.

The embodiment described with reference to FIGS. 3 and 4 may also be used when a mobile terminal is first switched on. For example, if the phone has been switched off, and is now in a different operator network from when it was previously switched on, then the above-identified approach may be used in order to seek and obtain the appropriate terminal parameter settings for the operator network within which the terminal is currently connected.

As such, this embodiment advantageously provides the user with the ability to automatically access mailbox-accounts, WAP-bookmarks, GPRS and MMS-settings, regardless of the user's location.

In a preferred embodiment, the request for an update of terminal parameter settings, responsive to the signal on line 312 for the parameter control block 306, is an SMS message to the setting server 328. Any embodiments, which implement the present invention, may use SMS messaging in order to seek an update of the terminal parameter settings.

The scope of the present invention is thus limited by the appended claims, and is not limited to any specific aspect of preferred embodiments described herein.

The invention claimed is:

1. A method of updating terminal settings for a client device in a telecommunications network, comprising:
   receiving, at a server from a client device, a notification message indicating one of a change in a parameter setting stored in the client device and a change of network operator domain via which the client device is communicating with the server;
   responsive to the received notification message indicating a change in a parameter setting stored in the client device and including the new setting value;
      checking, at the server, validity of the new setting value; and
      initiating transmission of a response corresponding to a valid parameter setting to the client device by sending a result of the checking step from the server to the client device; and
   responsive to the received notification message indicating a change of network operator domain to a new network operator domain, initiating transmission of a response comprising a valid parameter setting for the new network operator domain to the client device.

2. The method of claim 1, wherein the received notification message indicates a change of network operator domain;
   and wherein the step of initiating transmission of a response comprises:
      sending, from the server to a device management server, a request for a valid parameter setting for the new network operator domain to be sent to the client device by the device management server.

3. The method of claim 1, wherein the received notification message indicates a change of network operator domain;
   and wherein the step of initiating transmission of a response comprises:
      sending a valid parameter setting for the new network operator domain from the server to the client device.

4. The method of claim 1, wherein the received notification message is received at the server by way of a first one of a plurality of network services;
   and wherein the valid parameter setting comprises a parameter setting for a second one of the plurality of network services.

5. The method of claim 1, wherein the received notification message is a presence update from the client device;
   and wherein the server comprises a presence server.

* * * * *